April 19, 1955

W. A. RINGLER 2,706,578

FULLY PARTITIONED COLLAPSIBLE CARRIER
WHICH IS RIGID WHEN ERECTED

Filed May 10, 1949

INVENTOR.
WILLIAM A. RINGLER,
BY Allen & Allen
ATTORNEYS.

April 19, 1955
W. A. RINGLER
2,706,578
FULLY PARTITIONED COLLAPSIBLE CARRIER
WHICH IS RIGID WHEN ERECTED
Filed May 10, 1949
2 Sheets-Sheet 2
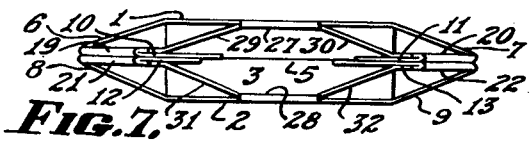
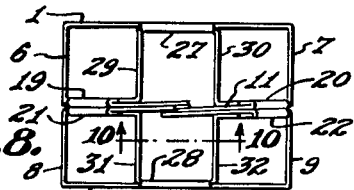
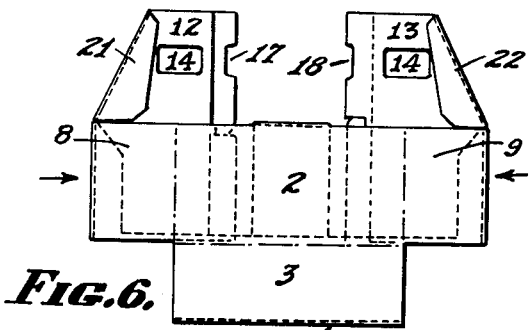
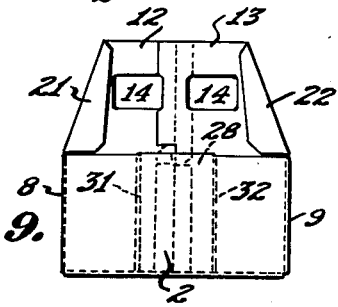
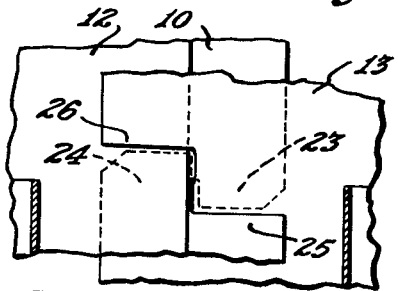
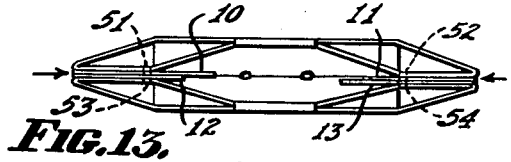
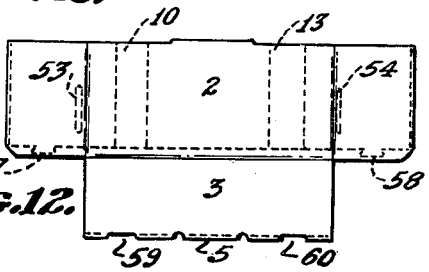
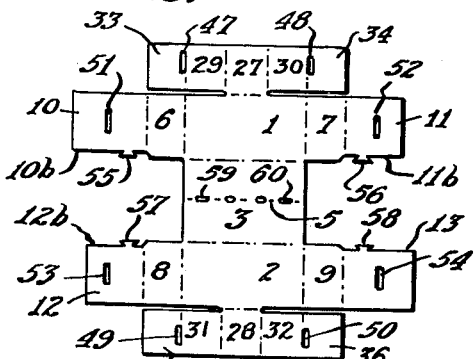
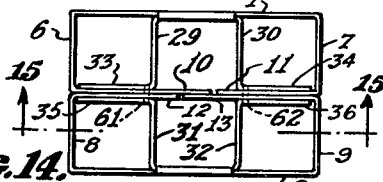
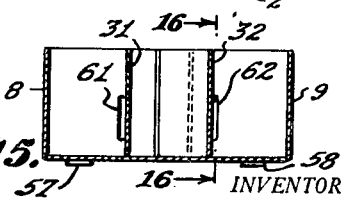
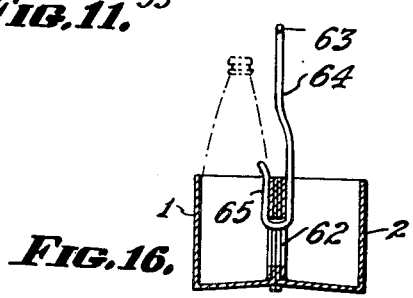
INVENTOR.
WILLIAM A. RINGLER,
BY Allen & Allen
ATTORNEYS.

United States Patent Office 2,706,578
Patented Apr. 19, 1955

2,706,578

FULLY PARTITIONED COLLAPSIBLE CARRIER WHICH IS RIGID WHEN ERECTED

William A. Ringler, Wayne, Pa., assignor to The Gardner Board and Carton Co., a corporation of Ohio Application May 10, 1949, Serial No. 92,452

6 Claims. (Cl. 220—111)

My invention relates generally to the provision of fully partitioned carriers for bottles or like articles sold and transported in convenient merchandising groups. The carriers disclosed herein are ones designed for a group of six bottles arranged in two rows of three each. The term "fully partitioned" as used herein not only refers to a carrier for such a group of articles or its equivalent, which carrier has a longitudinal partition and a plurality of lateral partitions on each side thereof, but also to partition structures which extend substantially the full depth of the side and end walls of the carrier, whereby each individual bottle or article is maintained in a separate cell and fully protected against impact with adjoining articles.

It is an object of the invention to provide carriers and modes of making them which are simple and economical, the carriers being exceptionally sturdy and capable of making many working trips.

Fully partitioned cartons have hitherto been suggested in a variety of forms. It will be understood that for economy of space in shipment and storage such containers must be collapsible, or at least must be produced in a knocked-down condition. But the greater number of carriers hitherto produced in knocked-down condition have a tendency to re-collapse on the initial fold lines. This is productive of substantial inconvenience in the initial filling operation, and many times such carriers will not maintain themselves in erected condition when only partially filled. After a period of use, the paperboard of the carriers tends to set in the erected condition in many carriers, and in consequence it has hitherto been suggested to provide carriers with some sort of temporary latch or lock to maintain the erected condition during the initial filling operation. Even when so equipped, however, the carriers hitherto known have exhibited a certain distortion in the erected condition due to the tendency to collapse along the initial fold lines. This is of little importance in hand filling operations. But the modern tendency is to fill paperboard carriers with bottles by automatic machines at the bottling plant. A series of the carriers in erected condition is placed in divisions in a bottle case, and the bottles descend into the cells of the individual carriers through a cage of resilient metallic fingers. The erected carriers cannot have a tight fit in the bottle cases or it would be difficult to position them therein. Consequently, the bottle case and its dividing partitions do not operate to prevent the relatively slight distortions of the bottle carriers arising from their tendency to recollapse, and the difficulty of filling the carriers by automatic machines is greatly increased.

It is an object of this invention to provide a type of carrier including means for maintaining it in erected condition, which carrier will be distortionless when erected. It is particularly an object to provide a type of carrier in which the forces tending to collapse it are oppositely directed and are hence so balanced that they do not tend to distort what should be a rectangular carrier into the shape of a parallelogram with acute and obtuse angles.

It is an object of the invention to provide a paperboard bottle carrier which is not only distortionless but is exceptionally rigid when erected.

These and other objects of the invention which will be set forth hereinafter or will be apparent to one skilled in the art upon reading this specification, I accomplish by that construction and arrangement of parts and in that procedure of which I shall now describe certain exemplary embodiments.

Reference is made to the accompanying drawings wherein:

Figure 6 is a plan view of the completed structure in knocked-down or collapsed condition after the final folding operation.

Figure 7 is a top plan view of the partially erected structure.

Figure 8 is a top plan view of the completely erected structure.

Figure 9 is a side elevation of the completely erected carrier.

Figure 10 is a partial elevation, with parts in section and on an enlarged scale, showing an interlock between longitudinal partition sections.

Figure 11 is a plan view of a blank for a modified form of carrier.

Figure 12 is a plan view of a carrier in completely folded and glued condition formed from the blank of Figure 11.

Figure 13 is a top plan view of the same carrier in partially erected condition.

Figure 14 is a top plan view of the same carrier in fully erected condition.

Figure 15 is a longitudinal sectional view thereof taken along the section line 15—15 of Figure 14.

Figure 16 is a transverse sectional view thereof taken along the line 16—16 of Figure 15.

Figure 1:
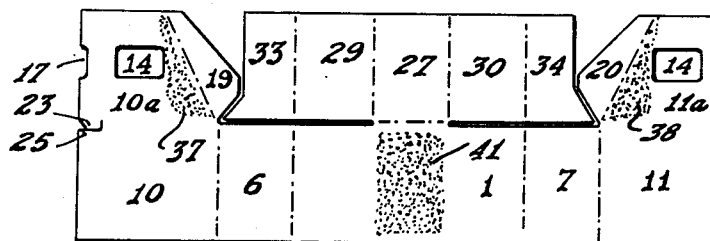
Figure 1 is a plan view of a blank for one form of my carrier.

The blank herein described will be formed from paperboard or boxboard of suitable weight and character by ordinary methods of cutting and scoring, as well understood in the art. The blanks may be printed as desired. Referring to Figure 1, I have shown a blank in rich solid lines to indicate lines of cut, and dot-dash lines to indicate lines of score. The blank provides a pair of side wall elements 1 and 2 spaced from each other by a bottom element or panel 3 articulated to the lower edges of the side wall elements and medially scored as at 5.

To the ends of the side wall elements I articulate partial end wall elements or panels 6, 7, 8 and 9; and to the ends of the end wall elements I articulate in turn longitudinal partition forming elements 10, 11, 12 and 13.

It will be noted that the longitudinal partition panel 10 is wider than the panel 11. The longitudinal partition forming panel 13, which is diagonally opposite the panel 10, is likewise wider than the panel 12.

In this particular embodiment the longitudinal partition forming panels 10, 11, 12 and 13 are prolonged to provide paperboard handle portions 10a, 11a, 12a and 13a, which are provided with hand holes 14. The edge portions of the wider panels 10 and 13 may be notched as at 17 and 18 for a purpose which will be clear hereinafter.

For the purpose of strengthening the paperboard handles, extra flaps 19, 20, 21 and 22 may be articulated to them by slantwise score lines, as shown. Locking notches formed by U-shaped cuts 23 and 24 and straight cuts 25 and 26 may be formed in edge portions of the panels 10 and 13.

To provide lateral partitions, I articulate to the top edges of the side walls 1 and 2 structures comprising central portions 27 and 28. To the side edges of these central portions there are articulated lateral partition panels 29, 30, 31 and 32. Attachment flaps 33, 34, 35 and 36 are in turn articulated to the side edges of the lateral partition panels. In the illustrated embodiment, the width of the attachment flaps 33, 34, 35 and 36 is diminished by the formation of the handle reinforcements 19, 20, 21 and 22. If the reinforcements are omitted, the lateral partition attachment flaps may obviously be made full sized. The depth of the lateral partition structures is preferably substantially equivalent to the depth of the side and end wall members, or only slightly less, so as to provide in effect full depth partitions forming complete individual cells.

The blank of Figure 1 is easily folded and glued on commercially available machines, particularly those of a type having folding fingers traveling with the blanks on chains or equivalent elements. Such machines are capable of making folds fore and aft of the direction of motion of the blanks through them; and they usually have two folding sections in which this may be done. As a first step in the folding and gluing of my blank, the lateral partition structures are infolded, and so also are the reinforcement panels for the handles, where such reinforcement panels are provided. These operations may be performed in indifferent order. Areas of adhesive 37, 38, 39 and 40 may be provided as illustrated, and the reinforcement flaps 19, 20, 21 and 22 folded over along their slantwise score lines in the first section of the machine, by way of example. Areas of adhesive 41 and 42 are provided either centrally of the side walls 1 and 2 or on the central portions 27 and 28 of the lateral partition structures; and the lateral partition structures are folded inwardly. The condition of the blank when these operations have been performed is illustrated in Figure 2.

Figure 2:
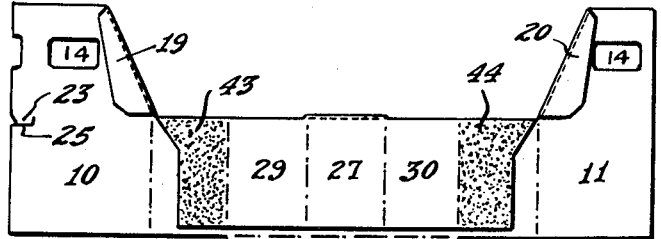
Figure 2 is a partial plan view showing the same blank after an initial folding operation.
Figure 4:
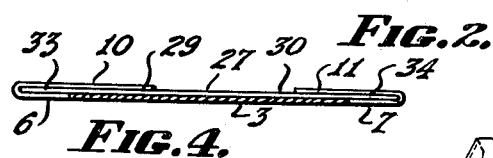
Figure 4 is a sectional view taken along the section line 4—4 of Figure 3.
Figure 3:
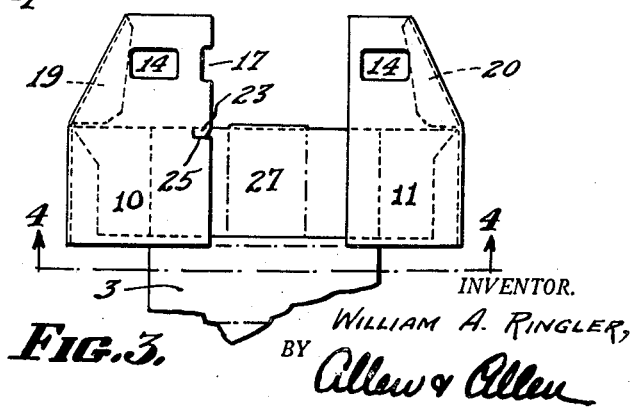
Figure 3 is a partial plan view of the same blank after a succeeding folding operation.

As a next operation, areas of adhesive, two of which are shown at 43 and 44 in Figure 2, are applied to the lateral partition attachment flaps 33, 34, 35 and 36, and the longitudinal partitions 10, 11, 12 and 13 are folded inwardly along the score lines which articulate them respectively to the partial end wall panels 6, 7, 8 and 9. The condition of the blank is now shown in Figure 3. The infolding of the longitudinal partition panels results in their adhesive union with the attachment flaps of the lateral partition structures. A cross-sectional view of the partially folded and glued blank is given in Figure 4.

Figure 5:
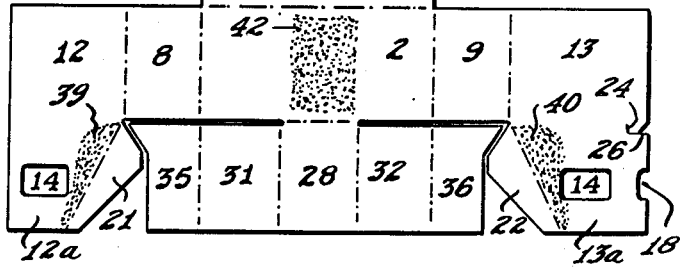
Figure 5 is a plan view of the partially folded blank after the completion of the operation illustrated in Figure 3, and showing the application of adhesive to longitudinal partition forming elements.
Figure 5:
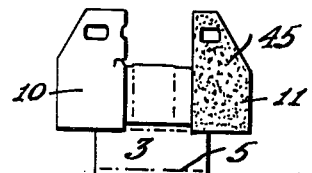

The blank in plan now appears as in Figure 5. The next operation is the application of adhesive to the longitudinal partition panels, as for example at 45 and 46, followed by the folding of the blank on the median score line 5 of the bottom panel 3. This results in bringing opposite pairs 10, 12 and 11, 13 of the longitudinal partition panels together, and into adhesive union.

The final condition of the folded and glued, knock-down structure will be appreciated from the elevational view of Figure 6 and the top plan view of Figure 7. It will be noted as characteristic of my structure that the central longitudinal partition is in two parts. In the collapsed condition, the partial end wall elements 6, 7, 8 and 9 are coplanar with the side walls 1 and 2, and the longitudinal partition elements formed of the panels 10, 11, 12 and 13 are separated and spaced from each other. The lateral partition elements 29, 30, 31 and 32 are coplanar or substantially coplanar with the side walls and the plane of the central longitudinal partition. To erect the structure it is only necessary to bring the two parts of the central longitudinal partition together. This may conveniently be done by pushing inwardly on the lateral ends of the structure illustrated in Figure 6, as indicated by the arrows. Under this inward pressure several actions occur: the end wall elements 6, 7, 8 and 9 erect themselves by folding at right angles to the side walls 1 and 2. The lateral partition panels 29, 30, 31 and 32 fold similarly with respect to the central portions 27 and 28 of the lateral partition structures, coming into spaced parallelism with the end walls 6, 7, 8 and 9; the bottom panel 3 unfolds along the median score line 5, its two parts coming into substantial coplanar relationship; and the two parts of the central longitudinal partition come together.

It has hitherto been pointed out that the longitudinal partition panels 10 and 13 are wider than their opposite panels 11 and 12 so that when the carrier is folded and glued as hereinabove described, each half of the longitudinal partition is provided with a flange or extending edge of one of the partition panels, as will be clearly evident in Figures 7 and 8. When the two parts of the longitudinal partition come together, these flanges overlap. The locking notches hereinabove described may therefore be interengaged as illustrated in Figure 10. The locking action is secure, and the two parts of the longitudinal partition are firmly fastened together. The entire erected structure is made very rigid. Moreover, it will be noted that any collapsing tendency inherent in the stiffness of the board would manifest itself in urging the two portions of the longitudinal partition apart, and this is prevented by the lock. Yet again the collapsing forces are equalized, and there is no rocking or twisting action. Were there no interlock between the portions of the longitudinal partition, and were a partial collapsing action to occur, this could be fully resisted by inward pressure on the mid-portions of the end walls, and the generally rectangular shape of the carrier would not be distorted.

A modified structure is illustrated in Figures 11 to 16 inclusive. This is a structure designed for use with a wire carrying handle, and in which the paperboard handle extensions are therefore omitted. The parts are in general the same; and like parts have been given like index numerals. Slots 47, 48, 49 and 50 are formed respectively in the lateral partition attachment blocks 33, 34, 35 and 36. These slots are for the attachment of clamping portions of a wire handle hereinafter described. Mating slots 51, 52, 53 and 54 are formed in the longitudinal partition panels 10, 11, 12 and 13. In this type of carrier it is possible to rely on the handle element to hold together the two laterally severable parts of the longitudinal central partition. Again, an interlock may be formed on the edges of panels 10 and 13, as described in connection with Figure 1, and the action of which is illustrated in Figure 10. It is also possible to provide another type of locking means, and in Figure 11 I have shown the lower edges of the longitudinal partition flaps 10, 11, 12 and 13 relieved as at 10b, 11b, 12b and 13b, so as to provide for the formation of small downwardly projecting tongues 55, 56, 57 and 58. Along the medial score line in the bottom panel 3, I may form cooperating slots 59 and 60 for coaction with these tongues.

The mode of formation, i. e. the folding and gluing, of the blank of Figure 11, may be the same as that described above for the blank of Figure 1, excepting, of course, that since no paperboard handles are provided, the folding over and adhesive securement of reinforcement flaps, such as 19, 20, 21 and 22, are omitted. Figure 12 shows in plan the final folded and glued condition of the modified carrier, while Figure 13 is a top plan view of the carrier as the erecting action is begun by the inward pressure in the direction of the arrows. The manner in which the carrier is erected will be clear from what has been said above.

In the folded and glued carrier the slots 47, 48, 49 and 50 in the lateral partition attachment flaps 33, 34, 35 and 36 mate with the slots 51, 52, 53 and 54 in the longitudinal partition panels 10, 11, 12 and 13. In Figure 15 it will be noted that these mated slots, as at 61 and 62, lie outside the lateral partitions 31 and 32. A wire handle element having a bail portion 63, and a pair of depending legs, one of which is indicated at 64 in Figure 16, and reversely bent lower leg portions, one of which is shown at 65, may be inserted through the slots 61 and 62 and drawn upwardly. The handle portions have a clamping action on the longitudinal partition panels and the adjacent attachment flaps of the lateral partition structures. This clamping action further resists any tendency for the attachment flaps of the lateral partition structures to tear or peel away from the longitudinal partition structures. It will further be realized that when the handle is in engagement in the slots 61 and 62, as shown in Figure 16, the two portions of the longitudinal central partition will be held against separation. Where the tongues, 55, 56, 57 and 58 are provided as described above, an upward pressure on the bottom of the erected carrier will cause these tongues to enter the slots 59 and 60, as illustrated in Figures 15 and 16, thus locking, or additionally locking, the carrier in the erected position.

Modifications may be made in my invention without departing from the spirit of it. Having thus described my invention in certain exemplary embodiments, what I claim as new and desire to secure by Letters Patent is:

1. A collapsible paperboard bottle carrier having in combination side walls and end walls and a bottom, said end walls and bottom being collapsible on median lines of fold, partial longitudinal partition forming parts extending inwardly from the lines of fold of said end walls and meeting centrally of said carrier, said longitudinal partition forming parts each comprising two panels of paperboard in adhesive union, the panels of each part being inwardly non-coterminous so as to provide flanges on the inner edges of said parts, said flanges being oppositely directed and in lapped relation in the erected carrier with an opposed pair of said longitudinal partition forming panels in edge abutting relation to form a substantially continuous longitudinal partition, said longitudinal partition parts being movable apart from each other in the collapsing of the carrier and when brought together serving to draw said end wall members inwardly to erect said carrier, and means for holding said longitudinal partition parts together with their flanges in lapped relation and said opposed pair of said longitudinal partition forming panels in edge abutting relation, whereby to maintain said carrier in the erected condition.

2. A collapsible paperboard bottle carrier having in combination side walls and end walls and a bottom, said end walls and bottom being collapsible on median lines of fold, partial longitudinal partition forming parts extending inwardly from the lines of fold of said end walls and meeting centrally of said carrier, said longitudinal partition forming parts each comprising two panels of paperboard in adhesive union, the panels of each part being inwardly non-coterminous so as to provide flanges on the inner edges of said parts, said flanges being oppositely directed and in lapped relation in the erected carrier with an opposed pair of said longitudinal partition forming panels in edge abutting relation to form a substantially continuous longitudinal partition, said longitudinal partition parts being movable apart from each other in the collapsing of the carrier and when brought together serving to draw the end wall members inwardly to erect said carrier, and interlocking notches in said flanges to fasten said longitudinal parts together and thereby maintain the carrier in the erected condition.

3. A collapsible paperboard bottle carrier having in combination side walls and end walls and a bottom, said end walls and bottom being collapsible on median lines of fold, partial longitudinal partition forming parts extending inwardly from the lines of fold of said end walls and meeting centrally of said carrier, said longitudinal partition forming parts each comprising two panels of paperboard in adhesive union, the panels of each part being inwardly non-coterminous so as to provide flanges on the inner edges of said parts, said flanges being oppositely directed and in lapped relation in the erected carrier with the edges of said flanges abutting the inner edges of the remaining panels forming said longitudinal partition parts to form a substantially continuous longitudinal partition, said longitudinal partition parts being movable apart from each other in the collapsing of the carrier and when brought together serving to draw the end wall members inwardly to erect said carrier, said tongues formed on the lower edges of said central longitudinal partition parts, said tongues cooperating with slots formed in said bottom panel along the median line of fold therein to maintain the flanges of said longitudinal partition parts in lapped, edge abutting relation and the carrier in the erected condition.

4. A collapsible paperboard bottle carrier having in combination side walls and end walls and a bottom, said end walls and bottom being collapsible on median lines of fold, partial longitudinal partition forming parts extending inwardly from the lines of fold of said end walls and meeting centrally of said carrier, said longitudinal partition forming parts each comprising two panels of paperboard in adhesive union, the panels of each part being inwardly non-coterminous so as to provide flanges on the inner edges of said parts, said flanges being oppositely directed and in lapped relation in the erected carrier with the edges of said flanges abutting the edges of the remaining panels forming said longitudinal partition parts to form a substantially continuous longitudinal partition, said longitudinal partition parts being movable apart from each other in the collapsing of the carrier and when brought together serving to draw the end wall members inwardly to erect said carrier, slots in said longitudinal partition forming parts for receiving the legs of a clamping handle, and a clamping handle having reversely bent leg portions passing through the slots in said longitudinal partition parts, the spacing of said slots being such that the clamping handle will maintain said longitudinal partition parts together with said flanges in lapped, edge abutting relation so as to thereby maintain the carrier in the erected condition.

5. A collapsible paperboard bottle carrier having in combination side walls and end walls and a bottom, said end walls and bottom being collapsible on median lines of fold, partial longitudinal partition forming parts extending inwardly from the lines of fold of said end walls and meeting centrally of said carrier, substantially full-depth lateral partition panels articulated to the said side walls and to the said longitudinal partition forming parts, said longitudinal partition forming parts each comprising two panels of paperboard in adhesive union, the panels of each part being inwardly non-coterminous so as to provide flanges on the inner edges of said parts, said flanges being oppositely directed and in lapped relation in the erected carrier with an opposed pair of said longitudinal partition forming panels in edge abutting relation to form a substantially continuous longitudinal partition, said longitudinal partition parts being movable apart from each other in the collapsing of the carrier and when brought together serving to draw said end walls inwardly to erect said carrier, said lateral partition elements collapsing with said longitudinal partition parts and further serving when the said longitudinal partition parts are brought together to force said side walls outwardly away from each other, and means for holding said longitudinal partition forming parts together with their flanges in lapped relation and said opposed pair of longitudinal partition forming panels in edge abutting relation, whereby to maintain said carrier in the erected condition.

6. A collapsible paperboard bottle carrier having in combination side walls and end walls and a bottom, said end walls and bottom being collapsible on median lines of fold, partial longitudinal partition forming parts extending inwardly from the lines of fold of said end walls and meeting centrally of said carrier, substantially full-depth lateral partition panels articulated to the said side walls and to the said longitudinal partition forming parts, said longitudinal partition forming parts each comprising two panels of paperboard in adhesive union, the panels of each part being inwardly non-coterminous so as to provide flanges on the inner edges of said parts, said flanges being oppositely directed and in lapped relation in the erected carrier to form a substantially continuous longitudinal partition, said longitudinal partition parts being movable apart from each other in the collapsing of the carrier and when brought together serving to draw the end walls inwardly to erect the carrier, said lateral partition elements collapsing with said longitudinal partition parts and further serving when the said longitudinal partition parts are brought together to force said side walls outwardly away from each other, the panels forming said longitudinal partition parts being prolonged upwardly to form, when brought together, an integral handle for said carrier, said prolongations including mating hand-hole openings, outer lateral edge portions of said prolongations constituting reinforcements thereto lying in inturned and adhesively secured condition, and means for holding said longitudinal partition forming parts together with their flanges in lapped relation, whereby to maintain said carrier in the erected condition.

References Cited in the file of this patent

UNITED STATES PATENTS

| | | |
|---|---|---|
| 732,844 | Gerbereux | July 7, 1903 |
| 2,105,270 | Scheffey | Jan. 11, 1938 |
| 2,163,290 | Powell | June 20, 1939 |
| 2,418,350 | Holy | Apr. 1, 1947 |
| 2,476,181 | Crane | July 12, 1949 |
| 2,532,446 | Hall | Dec. 5, 1950 |
| 2,539,304 | Hall | Jan. 23, 1951 |
| 2,584,689 | Foster | Feb. 5, 1952 |